Aug. 17, 1937. J. W. BRYCE 2,090,103
RECORD CONTROLLED AND RECORD MAKING ACCOUNTING MACHINE
Filed No 19, 1932 11 Sheets-Sheet 1

INVENTOR
James W. Bryce
BY
Cooper, Kerr & Dunham
ATTORNEYS

Aug. 17, 1937. J. W. BRYCE 2,090,103
RECORD CONTROLLED AND RECORD MAKING ACCOUNTING MACHINE
Filed Nov. 19, 1932 11 Sheets-Sheet 2

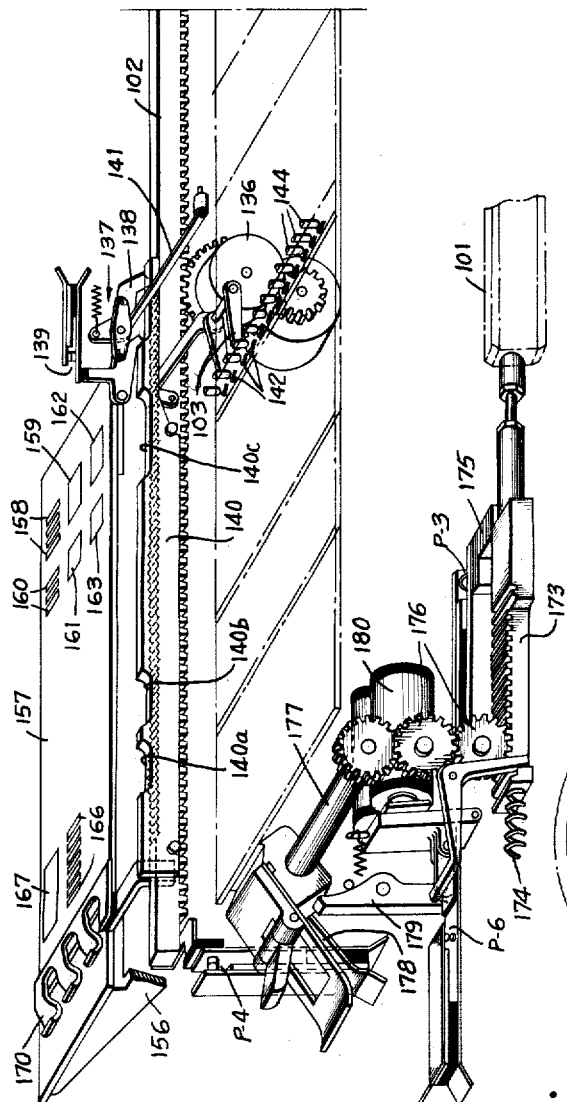

Aug. 17, 1937. J. W. BRYCE 2,090,103
RECORD CONTROLLED AND RECORD MAKING ACCOUNTING MACHINE
Filed Nov. 19, 1932 11 Sheets-Sheet 4

INVENTOR-
James W. Bryce
BY
ATTORNEY

Aug. 17, 1937.     J. W. BRYCE     2,090,103
RECORD CONTROLLED AND RECORD MAKING ACCOUNTING MACHINE
Filed Nov. 19, 1932     11 Sheets-Sheet 5
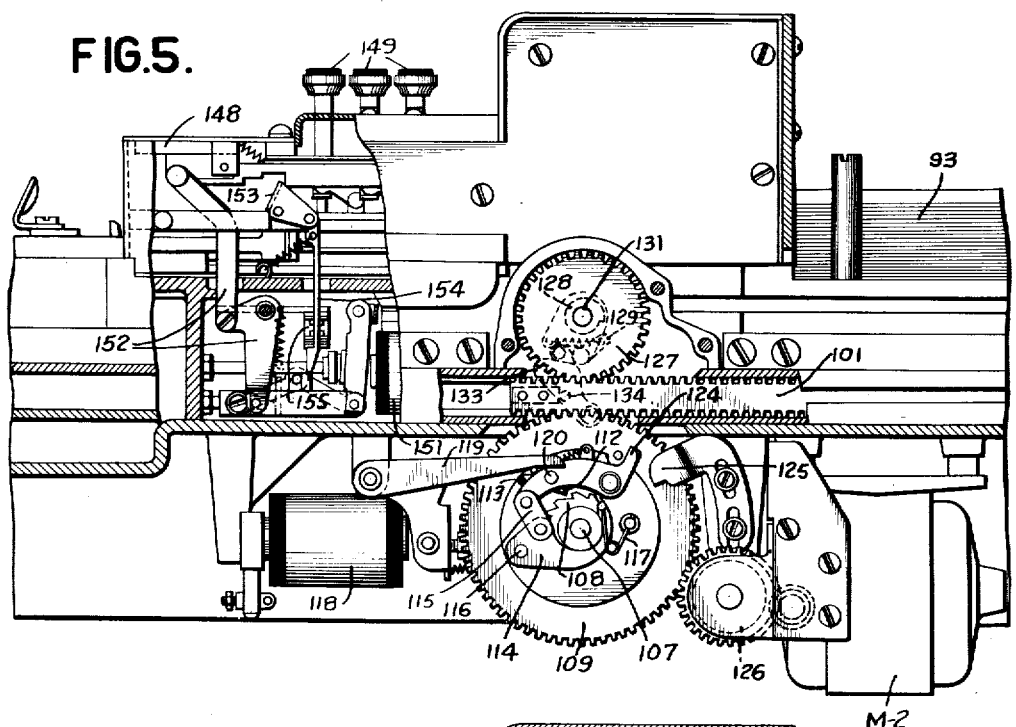
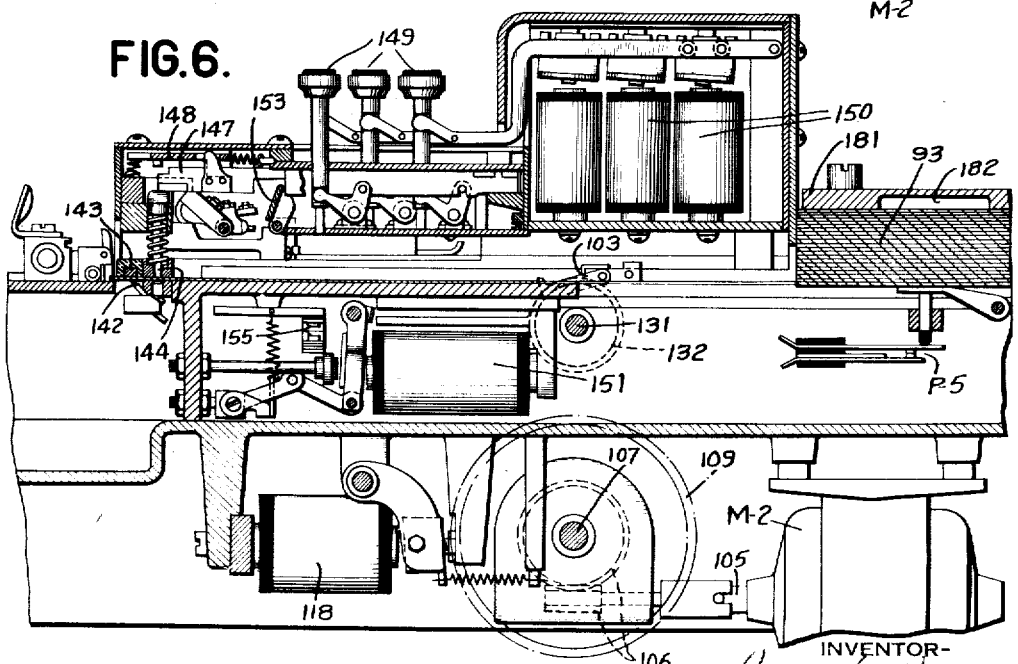
INVENTOR-
James W. Bryce.
BY
Cooper, Kerr & Dunham
ATTORNEYS Aug. 17, 1937. J. W. BRYCE 2,090,103
RECORD CONTROLLED AND RECORD MAKING ACCOUNTING MACHINE
Filed Nov. 19, 1932 11 Sheets-Sheet 6
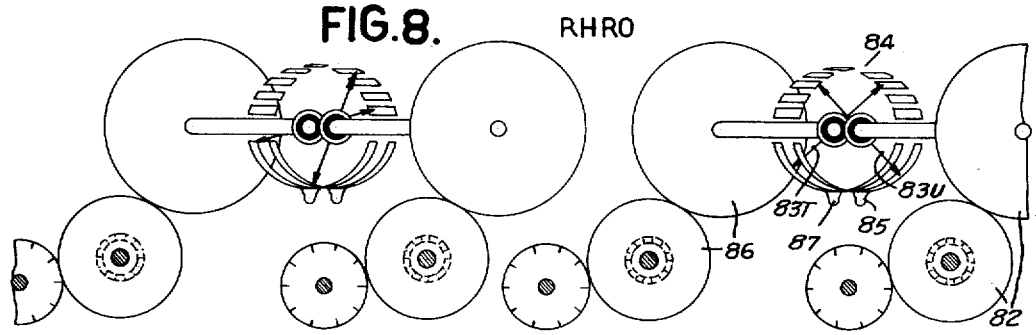
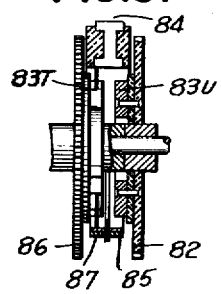
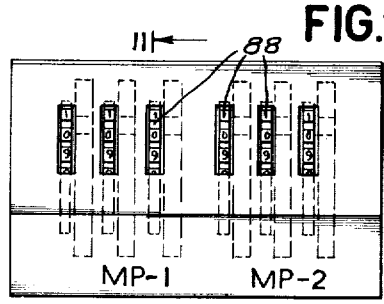
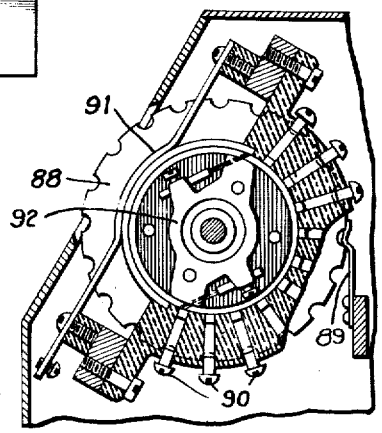
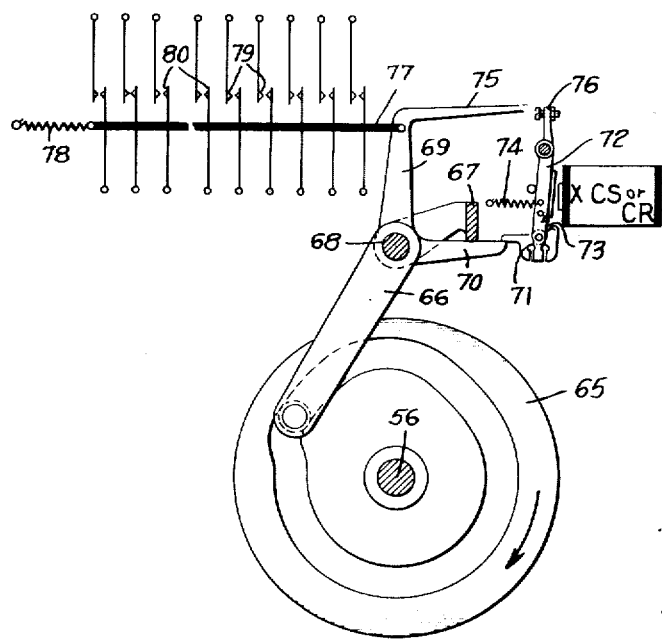
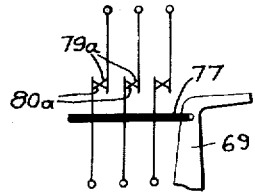
James W. Bryce
INVENTOR
BY Cooper, Kerr & Dunham
ATTORNEYS

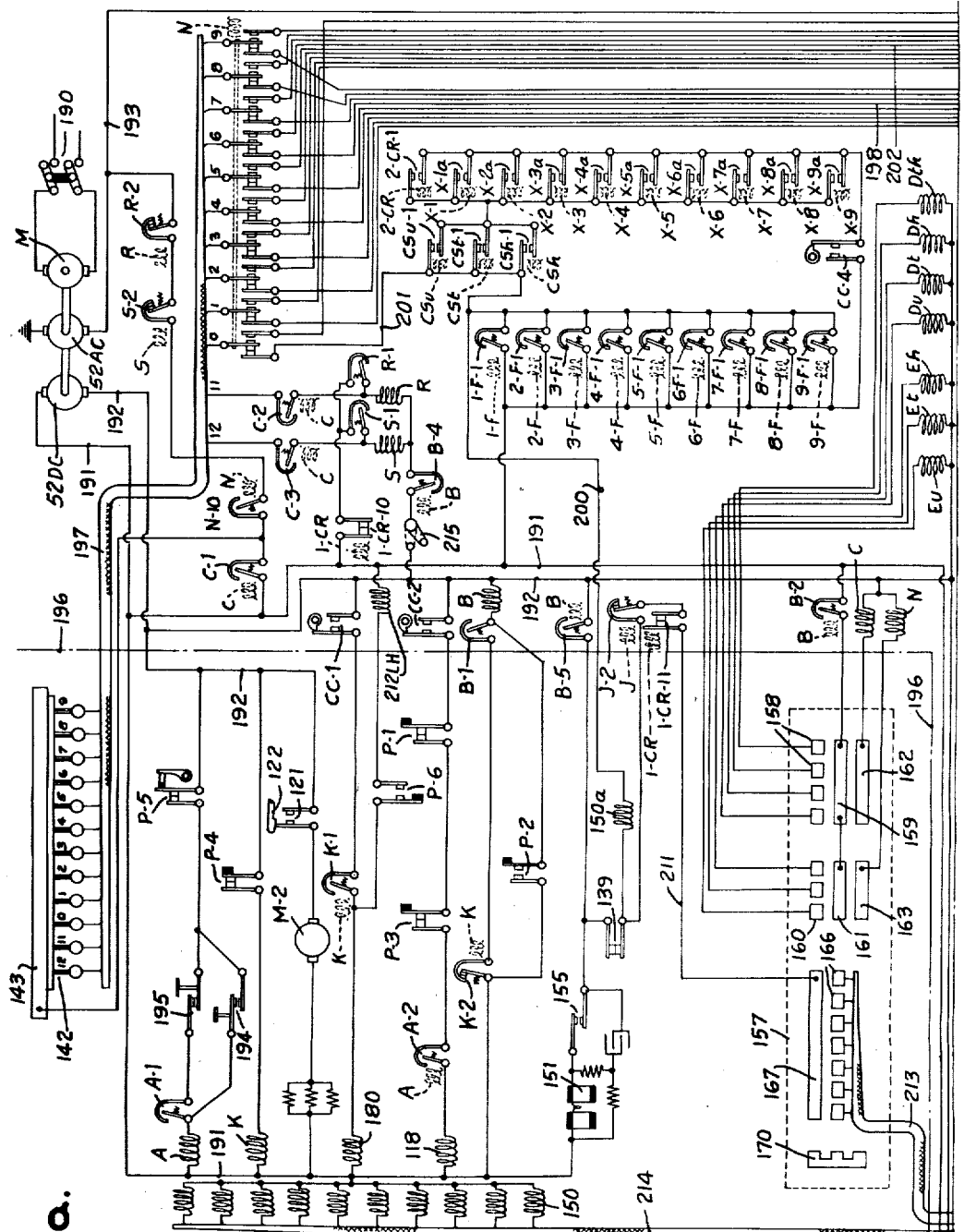

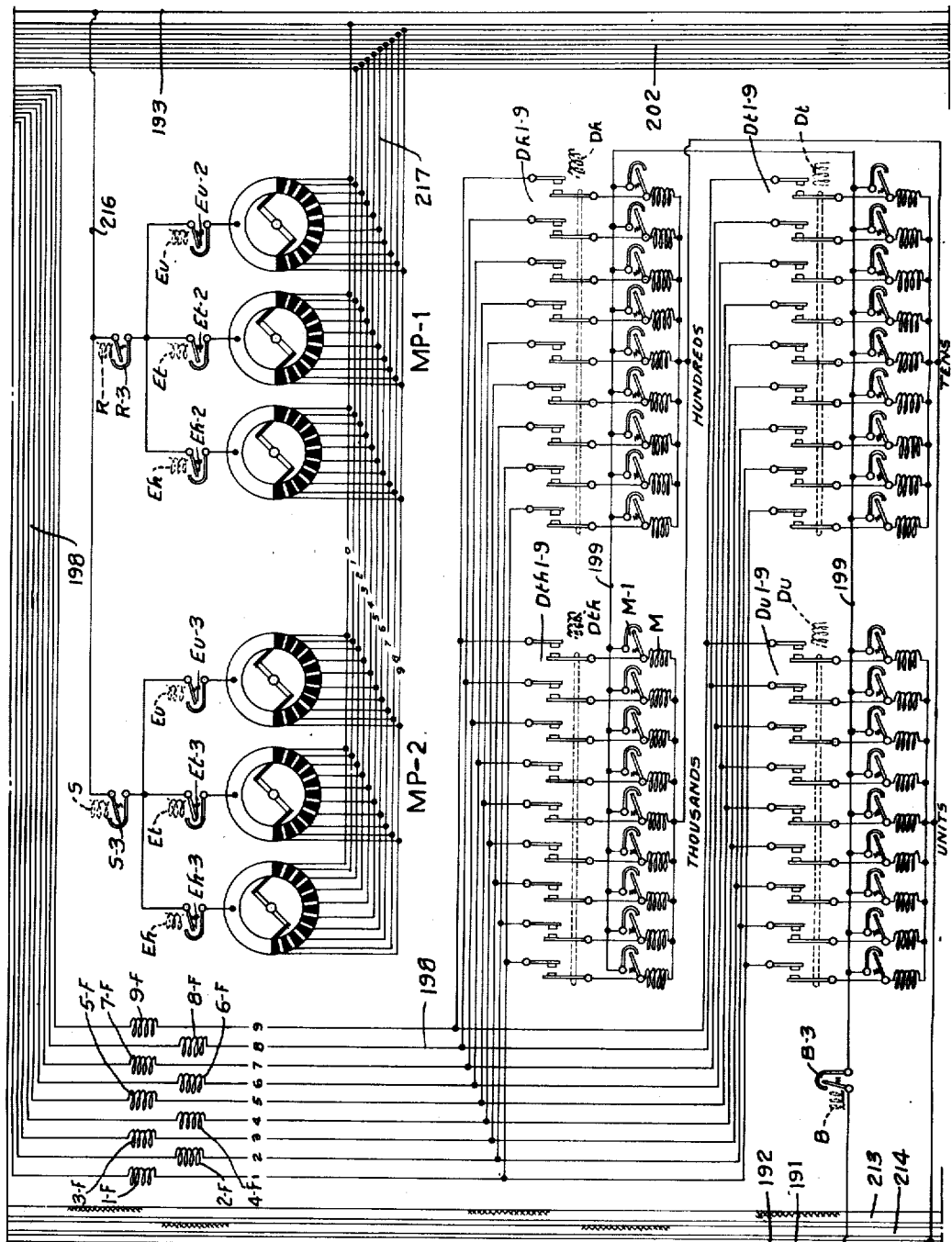

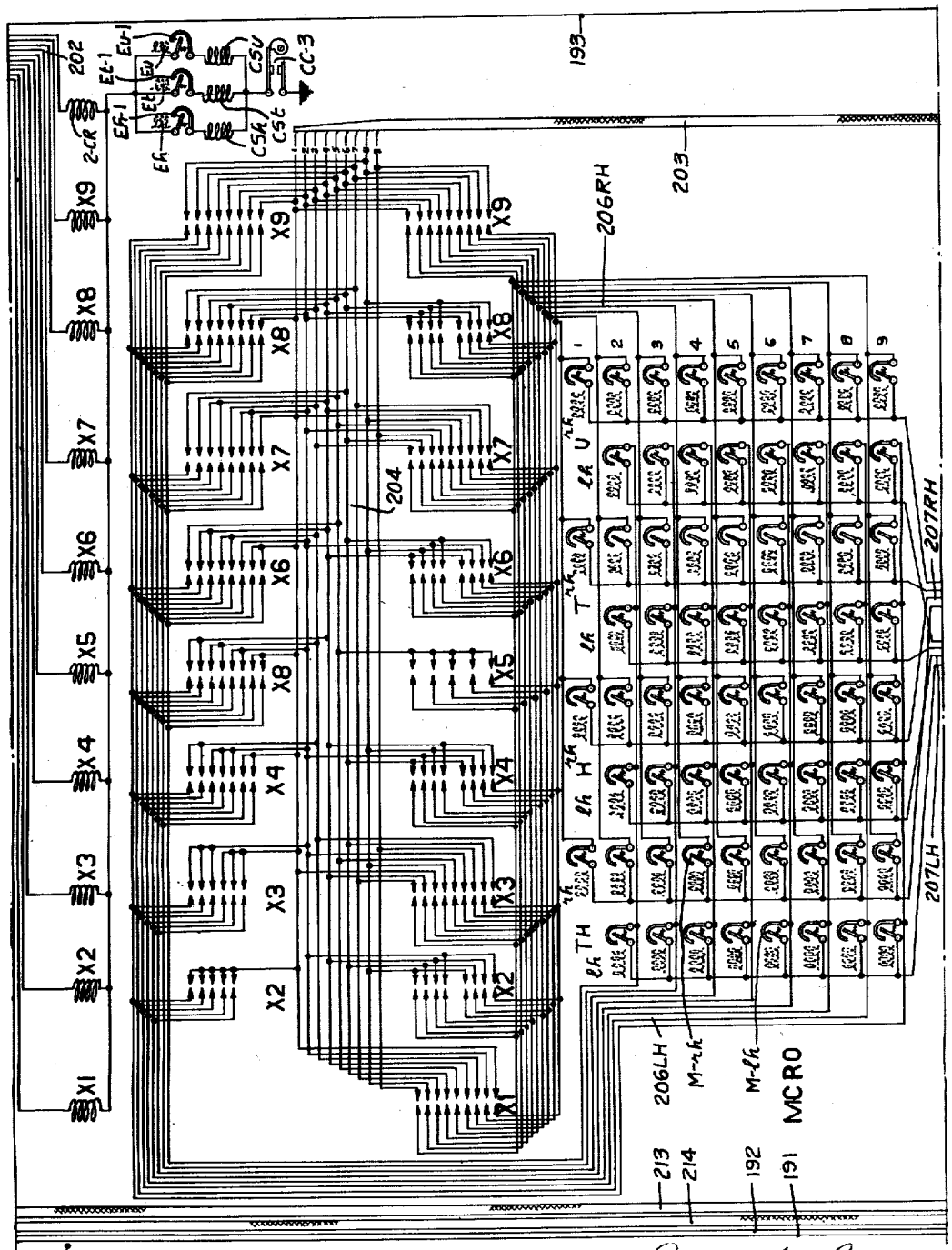

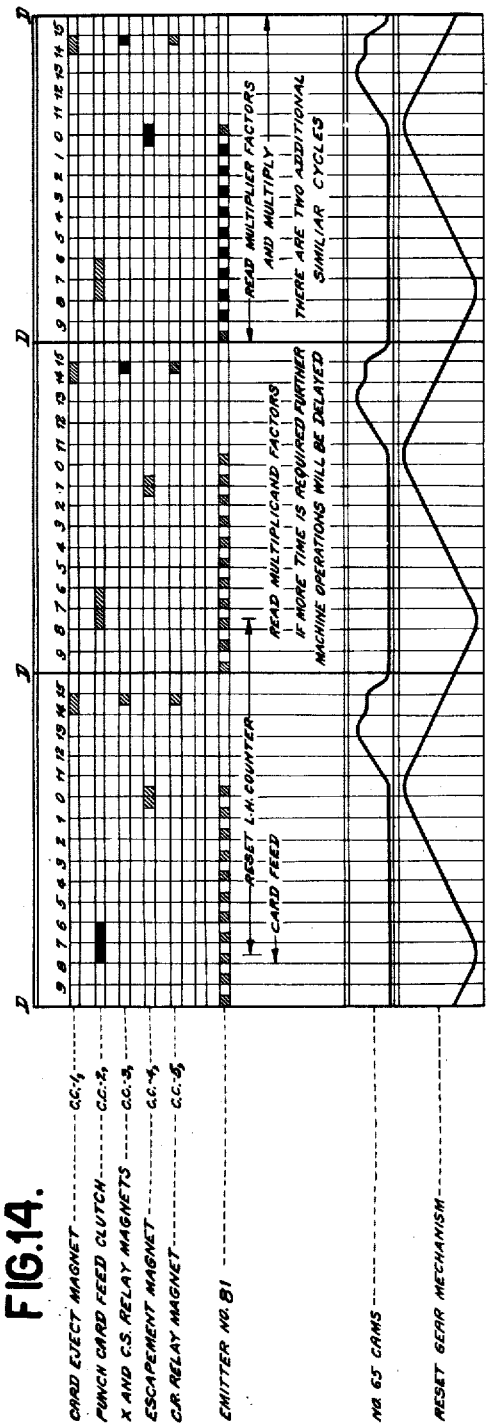
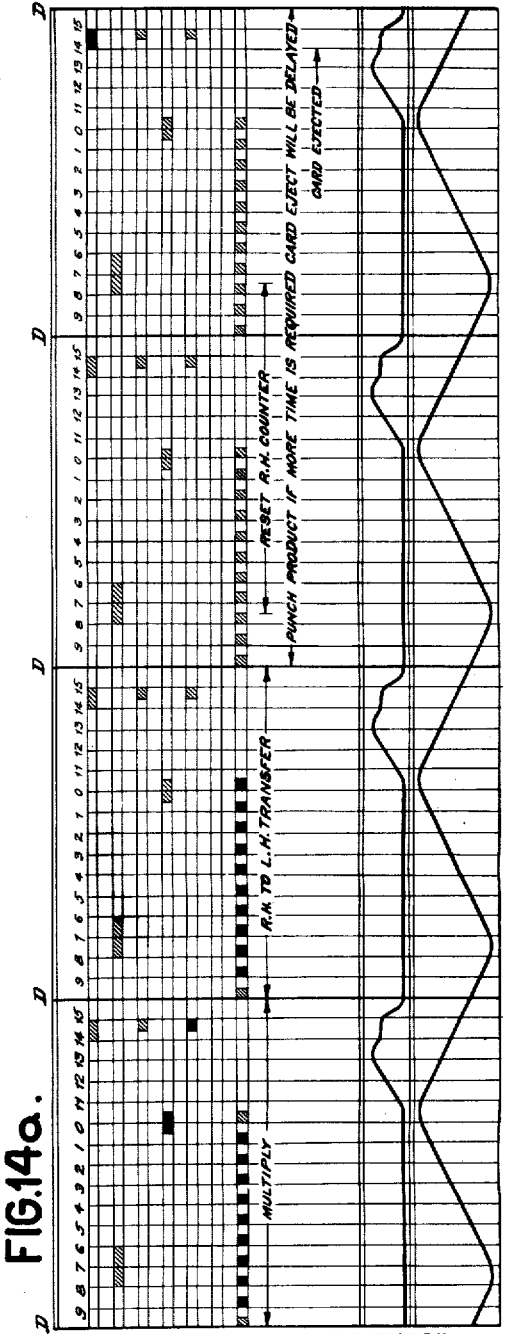

Patented Aug. 17, 1937

2,090,103

UNITED STATES PATENT OFFICE 2,090,103

RECORD CONTROLLED AND RECORD MAKING ACCOUNTING MACHINE

James W. Bryce, Bloomfield, N. J., assignor, by mesne assignments, to International Business Machines Corporation, New York, N. Y., a corporation of New York Application November 19, 1932, Serial No. 643,340

25 Claims. (Cl. 235—61.6)

This invention relates to record controlled accounting machines. More particularly the present invention relates to and has for its object the provision of a record controlled accounting machine adapted for performing multiplying computations and for punching product representations upon the record from which the factors of each computation was derived, and which machine is simpler, embodying a fewer number of sensing parts, a fewer number of punches and less accumulator mechanism than has heretofore been employed in machines for doing this class of work.

A further object of the present invention resides in the provision of a machine with provisions for taking prepunched records one by one from a card magazine and for passing these records past a reading or sensing device which successively, column by column, reads the factors of the computation from the records into the machine.

According to the present invention one factor is first read, column by column, and this factor is set up or stored in the machine and thereafter the record is advanced to permit the reading of the second factor by the same sensing mechanism and as this second factor is read, multiplication is effected step by step and column by column for each digit of the second factor. Provision is thereafter made for punching back the result upon the record from which the factors were originally derived.

A further object of the present invention resides in the provision of a multiple unit accounting machine, one unit comprising a reading in mechanism and a punching mechanism both of the step by step type and the other unit comprising a computing and registering mechanism.

A further object of the present invention resides in the provision of a multiplying machine of the aforementioned class with a step by step reading in and punching mechanism constituting one unit and a calculating and registering mechanism constituting a mechanically separate unit and in which provision is made for controlling the operation of each unit from the other unit.

Another object of the present invention is to provide a multiplying machine with means whereby a multiplicand amount may be taken from a record and a multiplier amount taken from a fixed setup device.

A further object resides in the provision of a machine in which one of two multipliers may be entered into the machine from a fixed setup device with selection of one or the other of the multipliers under record card control.

Further and other objects of the present invention will be hereinafter set forth in the accompanying specification and claims and shown in the drawings which by way of illustration show what I now consider to be one and a preferred embodiment of the invention.

In the drawings:

Figures 1 and 1a, taken together, show a diagrammatic view of the two units of the machine. The portion at the top of the two views includes the calculating unit and the portion at the bottom of the two views includes the reading in and punching unit. The separate units are connected by an electric cable;

Figs. 2 and 2a, taken together, show somewhat diagrammatically the punching mechanism and the reading in or sensing means;

Fig. 3 is a detail view of certain driving parts of the punching mechanism;

Fig. 5 shows a side elevational view of a portion of the punching mechanism of the machine with certain of the side parts broken away. The view is taken substantially on line 5—5 of Figs. 1 and 1a looking in the direction of the arrows;

Fig. 6 shows a transverse sectional view of the punching section of the machine. This section is taken substantially on line 6—6 of Figs. 1 and 1a looking in the direction of the arrows;

Fig. 7 is a side elevational view of one of the electro-mechanical multi-contact relays which are used in the machine;

Fig. 7a shows a modified contact arrangement;

Fig. 8 shows somewhat diagrammatically the arrangement and drive for one of the readout devices of the machine. The readout shown is the RH readout for the right hand accumulator and the arrangement for the LH readout is substantially the same except for the segment spots;

Fig. 9 is a detail sectional view of the readout showing the construction;

Fig. 10 is a front elevational view of a setup device to enable a fixed multiplier to be used;

Fig. 11 is a sectional view taken substantially on line 11—11 of Fig. 10 looking in the direction of the arrows;

Figs. 13a, 13b, 13c and 13d taken together and arranged vertically in the order named show the complete circuit diagram of the machine; and Figs. 14 and 14a taken together show the timing diagram of the machine.

Figure 1:
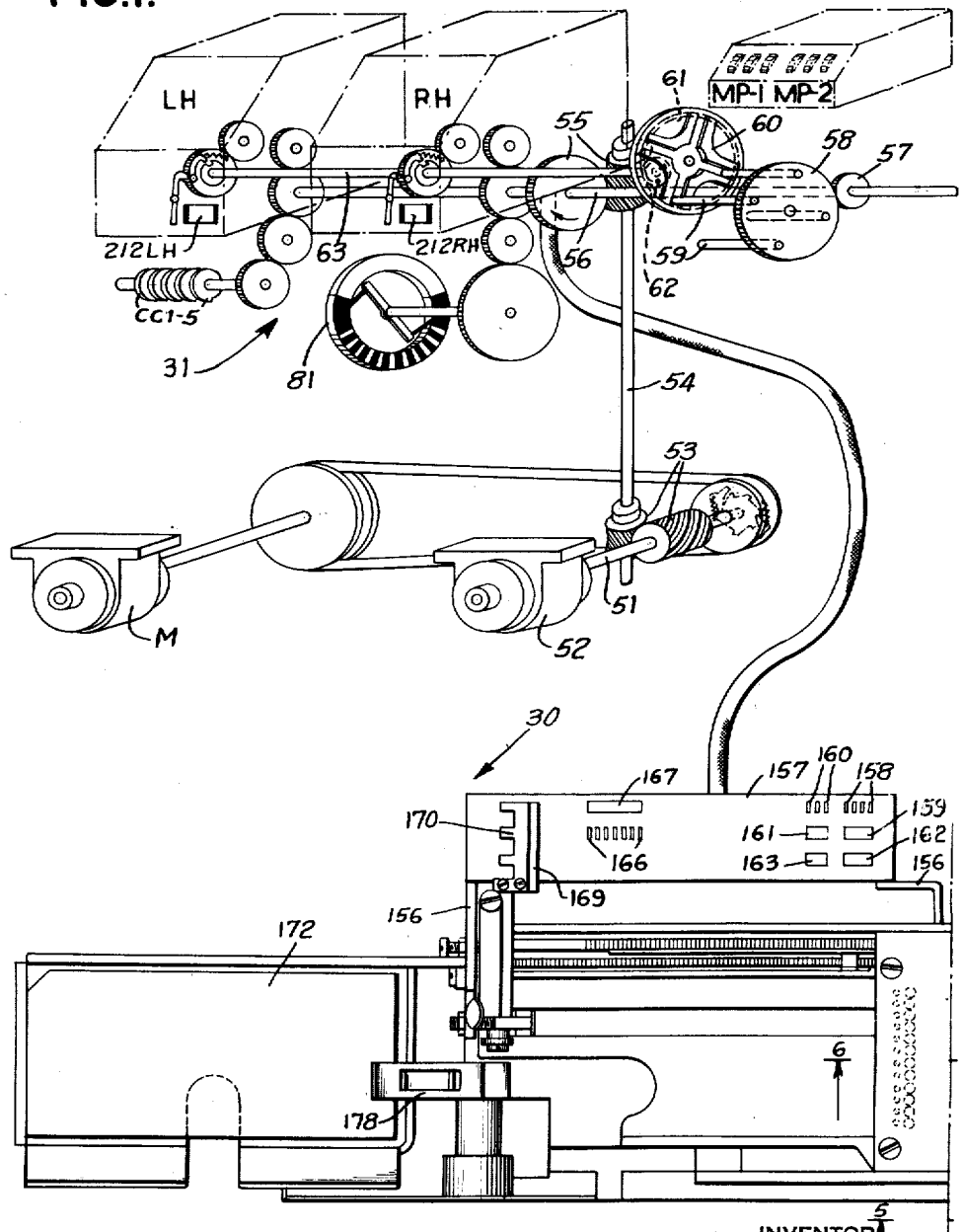
Figure 1A:
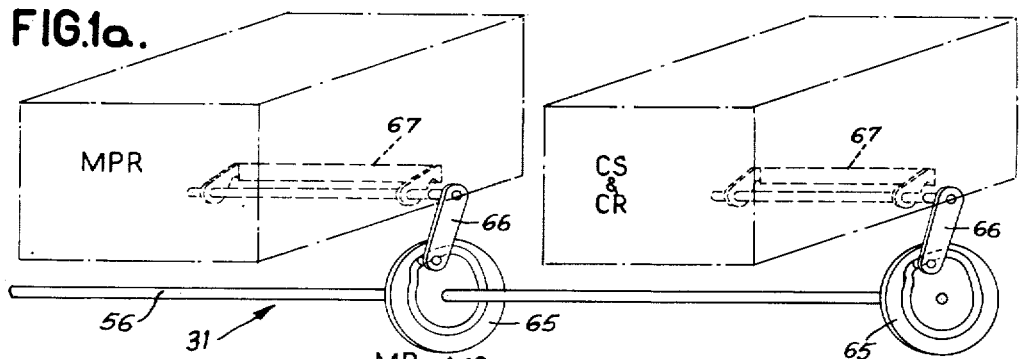
Figure 12:
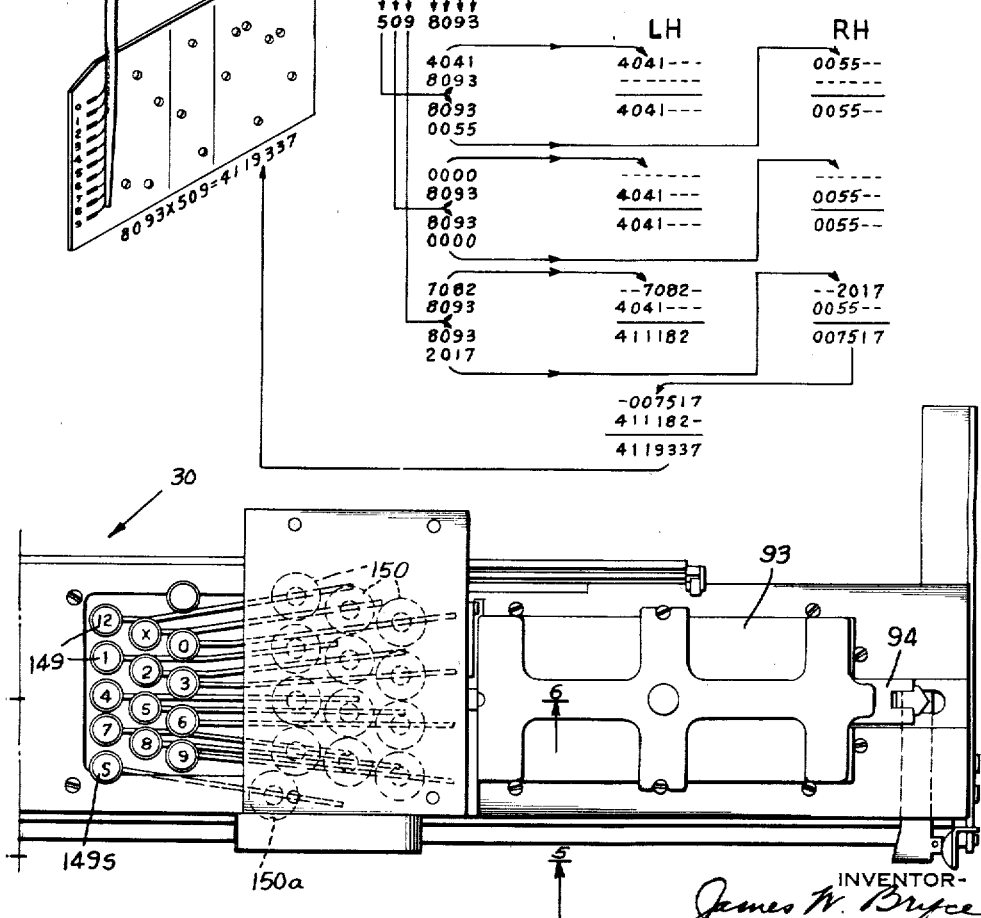
Fig. 12 is a diagrammatic view illustrating a typical computation of which the machine is adapted to perform.

In general the machine comprises a card reading and punching unit generally designated 30 in Figs. 1 and 1a and a registering and calculating unit generally designated 31 in Figs. 1 and 1a.

In the operation of the machine, cards which are pre-punched with the multiplicand and multiplier, are placed in the punching unit 30. The machine is set into operation and these cards are transferred through the punching mechanism and past a set of readout brushes disposed in the punching unit. These readout brushes read out from the card the multiplicand and set it up on suitable multiplicand relays. Thereafter the card further traverses through the punching section of the machine and the readout brushes sense the multiplier and as this multiplier is sensed column by column multiplying computations are performed entering left and right hand components of partial products into the registering section of the machine. This registering section is provided with two accumulators, one for left hand components of partial products and the other for right hand components of partial products. After the computation is complete and after the components are gathered into the registers, provision is made for accumulating together the left hand and right hand components of partial products in one registering mechanism and subsequently the total product is read out from this registering mechanism and this product is punched back by the punching mechanism upon the card from which the factors of the computation were originally derived.

The registering and calculating section is of comparatively simple construction. This will accordingly be first described. The calculating section is adapted to be driven by a constantly running motor M (Fig. 1) which motor by means of a belt and pulley drive, drives a shaft 51, which in turn drives an AC-DC generator 52. Shaft 51, through worm gear drive 53 drives a vertical shaft 54, which shaft through worm gearing 55, drives the main drive shaft 56. The various accumulators are driven from this shaft in the customary manner. The reset drive for the accumulator units is provided as follows. Shaft 56 carries a spur gear 57, driving a gear 58 with a four to one drive ratio. Gear 58 has extending from it four Geneva pins 59 cooperating with the other or cross element of the geneva, designated 60. Secured to 60 is an internal gear 61 meshed with the spur gear 62 mounted on the end of the reset shaft 63. The accumulators are reset from this shaft by reset shaft in the customary manner by electromagnetically controlled one revolution clutches.

Multi-contact relays

The electromagnetically tripped multi-contact relays which are used in the machine in the multiplying relay section, the column shift relay section and the CR section (see Fig. 1a), are those of the type customarily used in multiplying machines of this type. The shaft 56 drives operating cams 65 (Fig. 1a). Cooperating with each cam 65 is a follower arm 66 which is adapted to rock a bail 67 (see also Fig. 7). Loosely mounted on a shaft 68 which supports the bail 67 are a number of U-shaped members 69 each provided with an arm portion 70 extending under the bail 67 and cooperating with a latch member 71, which is pivotally mounted on the armature member 72 and spring urged in an anti-clockwise direction by the spring 73. The armature is normally rocked clockwise by a spring 74. Each member 69 has an armature knockoff arm 75 adapted to cooperate with a knockoff extension 76 of the armature. Also fixed to each member 69 is an insulated contact operating part 77 which is normally drawn to the left by a spring 78. The contacts 79 and 80 are provided, the latter 80 being fixed to the member 77. Upon the full movement of 77 to the left the contacts 79 and 80 will close.

In the operation of this multi-contact relay, the bail 67 is first displaced to the position shown in Fig. 7 and the arm 70 is slightly depressed to relieve the strain from the latch point where 70 cooperates with 71. A relay magnet X, CS or CR may then be energized, swinging the armature 72 to the right, causing the latch 71 to clear 70 and snap down under spring action by the spring 73, to a position opposite the end of member 70. Thereafter upon further motion of the cam 65 in the direction indicated by the arrow, the bail 67 is elevated allowing an anti-clockwise motion of member 69 and permitting the contacts to close under their own spring action. Subsequently, further movement of the cam 65 causes the bail 67 to be again depressed to reopen the contacts and to thrust 75 to the right to a supplemental extent to knock off any previously attracted armature. At this time there is a re-latching of the latch member 71 with the member 70. If a given armature is not energized, the latch 71 will not be tripped and such latch will prevent the anti-clockwise motion of member 69 and the closing of the contacts upon the elevation of the bail 67. Fig. 7a shows normally closed 79a and 80a contacts which open up instead of becoming closed upon the relay operation.

In the subsequent description of the wiring diagram, the contacts which have been designated 79 and 80 will be given designating numerals related to their associated control magnet.

Associated with the registering section of the machine is an emitter device 81 of conventional type which is driven from the shaft 56 in the usual manner.

Two accumulators are provided which are respectively designated LH and RH. They are of conventional construction including electromagnetically controlled clutches for controlling the entry of amounts thereinto. Each of these accumulators is provided with a readout device. The RH readout device will now be described.

Referring to Fig. 8, the units order gear train 82 drives a brush assemblage 83U which traverses the segments 84 and which receives current from a common conducting segment 85. The tens order train 86 drives a brush assemblage 83T which traverses the segments 84 and which receives current from a conducting segment 87. This arrangement is repeated for the relatively higher orders of the readout. On the RH readout, the segments 84 are provided with nine conducting spots and with the LH readout, ten spots are provided upon segments 84.

The wiring of the LH and RH readouts will appear on the circuit diagram to be subsequently described.

Fixed multiplier setup readout

In the present machine provision is made for at times using a fixed multiplier or multipliers. Hand setup devices are provided for these fixed multipliers. These hand setup devices are substantially the same in construction as the readouts heretofore described. They differ in providing means whereby the brush element may be positioned manually. There is provided a knurled wheel associated with each brush assemblage, which knurled wheel can be positioned and turned by hand.

Referring to Fig. 11, the knurled wheel is shown at 88. The periphery of this wheel may be provided with suitable designating indicia (see Fig. 10). The wheel may be impositively held in any set position by a spring detent 89. In this readout ten conducting spots generally designated 90 are provided and there is a single common conducting segment 91. The brush assemblage is generally designated at 92 and such brush assemblage is positioned by turning the knurled wheel 88. The wiring of the fixed setup MP readout will be shown and explained in connection with the description of the circuit diagram. As shown in Fig. 10, two sets of fixed setup MP readouts are provided, each being a three-wheel type for the three-order multiplier. Setups may be made of both of these multipliers and selection may be made between which of the fixed setup multipliers will be read. For convenience in subsequent explanation one of these fixed setup readouts will be designated MP—1 and the other one MP—2.

Punching mechanism

The punching mechanism is of the usual successively acting repetition punching type. It is generally of the form shown in Lee and Phillips United States Patent No. 1,772,186 and in British Patent No. 362,529 corresponding to United States application of Lee and Daly, Serial No. 391,874.

Figures 2A, 4:
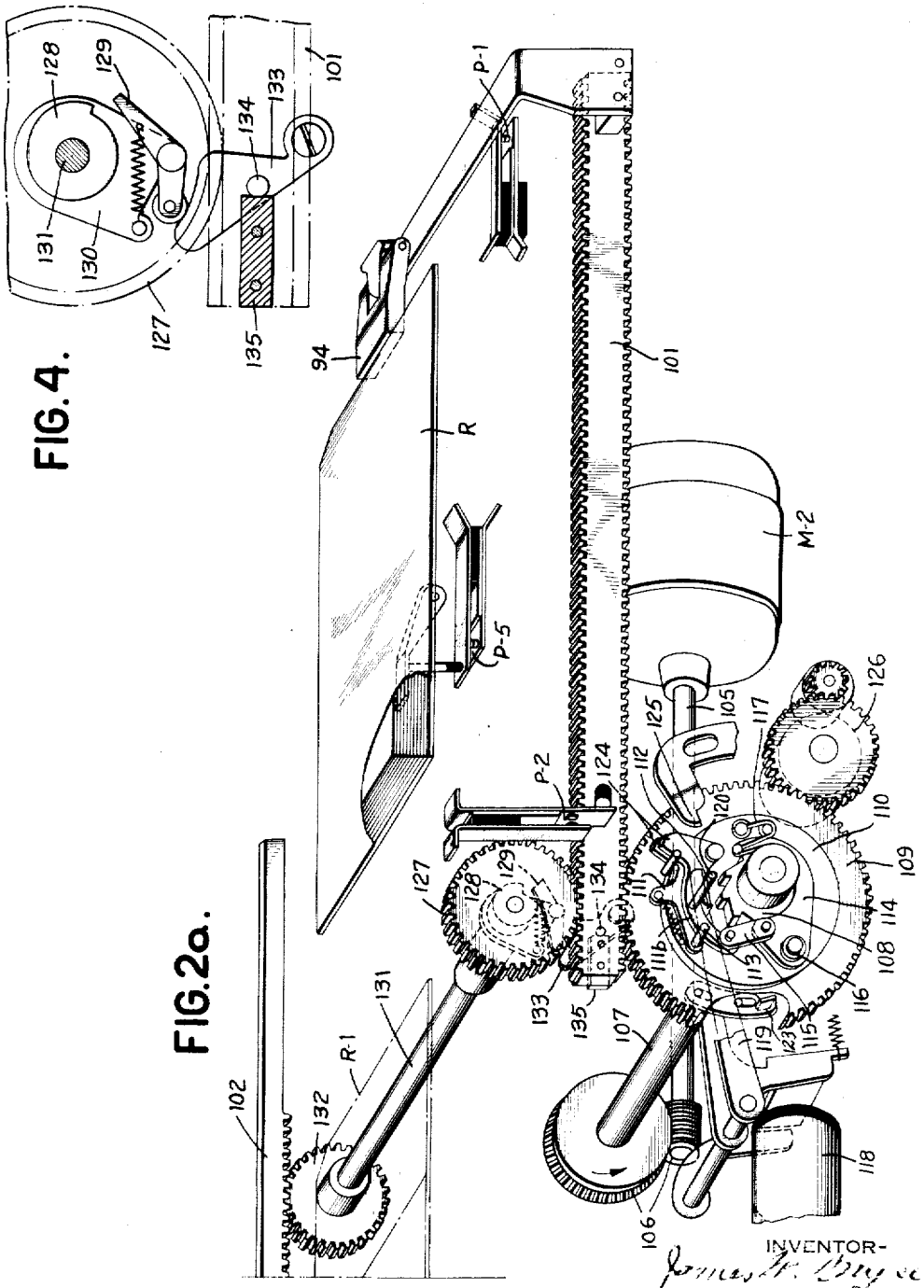
Fig. 4 is another detail view of certain parts of the punch.

In general it may be stated that the punching mechanism comprises a card supply magazine 93 (Figs. 1a, 5 and 6). With a supply of cards in the card magazine the lowermost card is adapted to be engaged by a picker 94 mounted on a bracket which is carried by a card feed rack 101 (Fig. 2a). On movement of the card feed rack 101 to the left from the position shown in Fig. 2a, the lowermost card R is transferred by the picker and card feed rack to an intermediate position shown in dotted lines and designated R—1. After the card reaches the R—1 position its further movement through the punching mechanism is effected by the card carriage rack 102 which card carriage rack has pushers 103 suitably carried by an arm thereon (see Fig. 2). Inter-connecting mechanism is provided intermediate the card feed rack 101 and the card carriage rack 102 and certain other driving mechanism is provided for actuating the card feed rack 101. Disposed below the base of the punching mechanism there is a motor M—2, which motor, through a shaft 105 and worm gearing 106 is adapted to drive a shaft 107, one end of which has secured to it a ratchet shaped clutch element 108. Loosely mounted on shaft 107 is a gear 109 meshing with the teeth on the underside of rack 101 and to which gear is secured a disk 110. Pivoted on disk 110 is a member 111 provided with a ratchet shaped clutch tooth 112. Alongside of member 111 and pivoted on the same pivot is another member 111b which lacks the clutch tooth. On 111 is a pin 113 overlying an arcuate surface of 111b. The free end of 111b is connected to a toggle member 114 by a link 115. The toggle member 114 is pivoted on the disk 110 by a pin 116. The opposite end of 114 remote from its pivot 116 is connected to a spring element 117, which spring tends to hold the clutch tooth 112 out of engagement with the clutch tooth of element 108 and allows it to engage when 114 is shifted. For the purpose of effecting a clutching action a punch feed clutch magnet 118 is provided. This magnet when energized attracts its armature and causes an arm 119 to engage a pin 120 (see also Fig. 5) depressing 111b and allowing 111 to descend so that the tooth 112 engages with the ratchet 108. Upon such engagement gear 109 will be driven in counterclockwise direction substantially a single revolution, shifting rack 101 to the left. This action will, through the card pusher shown in Fig. 2a, move the card from the R position to the R—1 position. Also when magnet 118 is energized, an arm 119b on the armature (see Fig. 3) will close contacts 121. Such contacts are latched closed by a latch 122. The latch 122 is tripped to allow the contacts to re-open by a knockoff 123, carried on the back of gear 109 (see Fig. 2a). At the termination of the counterclockwise movement of gear 109, the tails 124 of parts 111 and 111b will strike a projection 125 on a fixed plate to effect the disengagement of the tooth 112 from the ratchet 108. This action also restores the toggle parts to normal position.

The above driving action has wound up a spring in a barrel 126. Upon disengagement of the one revolution clutch tooth 112, rack 101 returns to the right under the influence of the spring in barrel 126. The driving train to the second card carriage rack 102 is as follows. Rack 101 has its upper teeth meshed with a gear 127 which has secured to it a member 128 (see also Fig. 4) having a single notch or tooth disposed in the plane of pawl 129 which is pivoted on part 130 fixed to the shaft 131. 131 on its opposite end carries a gear 132 (see Fig. 2a) which meshes with the card carriage rack 102. Suitable mechanism shown in Fig. 4 controls the co-action of pawl 129 with member 128 so that with the rack 101 in extreme right hand position pawl 129 will be disengaged from the clutch element 128. Such disengagement is effected by the rocking of 133 in a clockwise direction by the co-action of a pin 134 with a block 135 carried on rack 101. Upon initial movement of 101 to the left the block 135 will clear the pivoted camming element 133 allowing a slight counterclockwise motion of it so that 129 under spring action may rock and engage the tooth of member 128. Thereafter drive will come from 101, through gear 127, through 128 to pawl 129, to 130, to shaft 131, through gear 132, to traverse rack 102 to the right. The card carriage rack 102 will thus be shifted to extreme right hand position permitting the card pushers 103 to first ride over the surface of the card and ultimately engage back of the trailing edge of the card at the R—1 position. Rack 102 has associated with it a spring drive comprising the usual spring barrel 136. This spring is wound up by the traverse of 102 to the right and is adapted to cause a movement of 102 to the left under spring action. The rack 102 also has associated with it an escapement mechanism 137 having a dog 138. This escapement is more fully described in Schaaff United States Patent No. 1,426,223 and in Lee and Phillips Patent No. 1,772,186. The usual controlling contacts 139 customarily used in machines of this class are also provided cooperating with the escapement parts.

Removably secured to the card carriage rack 102 is a skip bar 140 provided with a multiplicity of notched or depressed portions and according to the location of these notches a skip lifter lever 141 is adapted to be allowed to descend or to remain in elevated position. When the skip lifter lever drops into one of the notches of the bar 140 it allows the dog 138 of the escapement mechanism to cooperate with the upper teeth of the rack 102. Such dropping of the skip lifter lever is also adapted to close contacts 139. With the skip lifter lever 141 riding on top of the skip lifter bar 140, the escapement will be disabled so that the card carriage rack 102 can traverse without stopping at each card column until a notch is encountered. Thereafter an intermittent motion of the card carriage follows under spring action which intermittent motion is controlled column by column by the escapement until the skip lifter lever is again elevated by riding out of one of the notches of the bar 140. It will be understood that skip bars of different configuration with the notches or depressed portions of different lengths and at different positions can be placed on the card carriage rack and in this way the intermittent motion and punching and reading out action can be brought about at selected points on the card according to the conformation of the skip bar.

It will be understood that with the above described skip bar and skip lifter construction that if a card is in the R—1 position (Fig. 2a) and engaged by the pusher fingers 103, that immediately thereafter the card will be traversed with a continuous movement to the left until the first skip bar notch on 140 comes into action to stop the card carriage. The card will then be in a position for the beginning of a reading out of the multiplicand amount from the card. The readout means comprises a set of card sensing brushes 142 (Figs. 2 and 6). These brushes are disposed below the card, one brush being provided for each index point position and the set of brushes have associated therewith the usual common contact block 143 which is disposed above the card which is being read. As the card traverses step by step past the brushes 142, the amount of the multiplicand is read from the card. The highest order digit of the multiplicand is read first and thereafter as the intermittent motion of the card takes place the successively lower orders of the multiplicand are read from the card and set up upon suitable relays in a manner which will be more fully explained in connection with the description of the circuit diagram. After the multiplicand has been completely read from the card, the skip lifter lever 141 rides out of the notch 140a and the high portion of the skip bar causes the card to escape and to be traversed uninterruptedly to the left until the skip lifter lever 141 drops into the second notch 140b. When in this notch the card is again arrested and thereafter again advances intermittently step by step and during this phase of the operation the multiplier is derived from the cards by the sensing brushes 142. It may be here explained that the spacing from position to position or column to column during reading out of the multiplicand and of the multiplier is controlled under the influence of a so-called space magnet which is provided in machines of this class. This spacing magnet initiates the action of the operating magnet in the punch section which in turn initiates the spacing.

The operation of calculating or multiplying will be fully set forth in the description of the circuit diagram and therefore need not be described at this point.

It may be explained, however, that the card is not transferred from the one column to the next when in multiplier positions until each computation pertaining to each columnar order is complete. After the multiplier has been read in and entered the skip lifter lever 141 rides out of the notch 140b and the card is then displaced by an uninterrupted movement until the skip lifter lever drops off into the notch 140c. It is at this time that the product punching is effected. The extent of skip between the multiplicand and multiplier and between the multiplier and the product will, of course, depend upon the calculation which is being performed and it will also depend upon the configuration of the skip lifter bar 140 and upon disposition of the contacts on contact bar 157 (to be hereinafter described). In practice the contact bar 157 is made to conform to the skip lifter bar 140 which is used for a particular calculation. The arrangement can be varied, except that the arrangement must be one in which the reading of the multiplicand must precede the reading of the multiplier.

The punching mechanism need not be fully described as it is set forth in the Lee and Phillips patent above referred to. In brief, it comprises a set of punches 144 (Figs. 2 and 6), which punches are adapted to be depressed to perforate the card by the action of interposers 147 and an operating bail 148. The interposers 147 are selectively thrust forward to bring about punching action either by means of the keys 149 or by energization of punch selector magnets 150. Bail 148 is magnetically operated by means of the punch operating magnet 151. The skip or spacing magnet is a magnet similar to 150 and is designated 150a on Fig. 1a. This magnet is cooperatively associated with an interposer which is interlinked with the space key 149s (Fig. 1a) and such interposer has no cooperating punch associated therewith so that upon its action no punching is effected. The connections to the bail 148 from the armature of the punch operating magnet 151 are shown in Fig. 5 and are generally designated 152. The energization of magnet 151 is effected by means of a bail 153 which bail is adapted to be rocked upon the thrusting forward of any of the punch selecting interposers or of the spacing interposer. Rocking of the bail 153 through a link 154 is adapted to close contacts 155 and bring about an energization of the punch operating magnet 151. As is customary in machines of this class, contacts 155 immediately open after the magnet 151 has attracted its armature and brought about the punching operation.

Referring to Figs. 1 and 2, alongside of the card carriage rack 102 and fixed to the frame of the machine are members 156 carrying a plate of insulating material 157. Disposed in the plate of insulating material are a number of spots of conducting material. Spots 158 correspond in number and position to the number and position of the columns of the multiplicand and alongside of and in alignment with these spots is a strip of conducting material 159. Also on plate 157 are a number of individual spots 160 which correspond in number and position to the number and position of the columns of the multiplier. Associated and alongside of these spots 160 is a common long spot 161. In the multiplicand and multiplier zone of plate 157 there are also provided supplemental segments 162 and 163 in alignment with the multiplicand and multiplier spots respectively. Also disposed in plate 157 are a series of conducting spots 166 having disposed alongside thereof a common conducting strip 167. Spots 166 are those utilized in reading out the product and these in number and position correspond to the number and position of the columnar spaces in the product. Carried by the card carriage rack 102 is a bracket 169 which carries a brush assemblage 170. The brush 170 is adapted to establish circuit connections between 158, 159 and 162 and between 160, 161 and 163 and between 166 and 167.

After the card has been completely punched, provision is made for ejecting the card from the machine and for delivering it into a discharge magazine 172 (Fig. 1). The card eject mechanism as shown in Fig. 1 is shown with the parts in the position which it assumes before the machine was started into operation or in the eject position. Upon the first card feeding operation through the punching section of the machine, rack 101 will have moved towards its extreme left position. After reaching the dotted line position shown in Fig. 2, 101 moves further to the left and thrusts a rack 173 to the left compressing coil spring 174. Bearing against a shoulder on rack 173 is a contact operating part 175. When 173 is thrust to the left, contacts P—3 which were previously closed, will open under their own spring action and contacts P—6 which were previously open will become closed. The displacement of rack 173 to the extreme left position will, through intermediate gears 176, rock a shaft 177 in a clockwise direction to bring an ejector clip assemblage 178 away from the position shown in Fig. 2, to a position in which the ejector clip can receive a card which has been advanced through the machine. With the ejector clip assemblage 178 disposed in such card receiving position, the assemblage will be latched in such position by a latch 179 which latch is fully described in British Patent No. 362,529 (see latch 216 of that patent in Fig. 16). The ejector clip latch is adapted to be released by the energization of the ejector clip magnet 180, whereupon the ejector clip assemblage which has then grasped a card swings from the card receiving position to the position shown in Fig. 2, in which position the jaws of the ejector are opened up so that a card can be discharged therefrom, and delivered into the card magazine 172 (Fig. 1).

*Contact devices in the punching section of the machine*

The contact devices P—3 and P—6 have been previously described. In the punch there are other contact devices as follows. Contact devices P—1 (Fig. 2a) are contacts which are closed when the rack 101 is in extreme right hand position. Contacts P—2 (Fig. 2a) are normally open contacts and are arranged to be closed when rack 101 makes a complete movement to the left. Contacts P—5 (see Fig. 2a) are card magazine contacts which are arranged to be closed upon the presence of cards in the card magazine and to open up when the last card has been discharged therefrom. To allow closure of these contacts, the card follower plate 181 is provided with a clearance space 182 at the bottom as shown in Fig. 6. Contacts P—4 are likewise provided (see Fig. 2). These are so-called last column contacts and are arranged to be closed when the card carriage rack 102 is beyond the last column position and to be open when this rack is in any way of its other positions away from the last column position.

*Supplemental parts in calculating section of the machine*

The calculating section of the machine includes the usual CC cam contacts, the cams of which are numbered to correspond to the contacts as CC—1 to 5 inclusive on Fig. 1.

*Circuit diagram*

Before describing the operation of the machine, it may be explained that the machine is adapted to derive both the multiplicand amount and the multiplier amount from prepunched record cards, or if desired, the multiplier amount can be derived from the fixed setup device.

In the operation of the machine the multiplicand amount is read column by column from the card and such multiplicand amount is set up on a multiplicand entry retaining device which is in the form of a set of relays. This multiplicand entry retaining device includes a readout contact section.

The operation of the machine will now be described and the machine will first be described with both the multiplicand and multiplier factors read from a record.

Referring to the circuit diagram (Fig. 13a), the first operation is to close the main switch 190 (Fig. 13a) to supply current from a source to a driving motor M and set the AC-DC generator 52 in operation. Direct current is supplied to buses 191 and 192 and alternating current impulses are supplied to bus 193 and to ground. Properly pre-punched cards are placed in the card magazine of the punch and the punch parts in starting up the machine are in the position shown in Figs. 2 and 2a. The start key 194 (Fig. 13a) is then depressed and the circuit to relay coil A is completed through the start key contacts and through the contacts P—5 in the punch now closed. The energization of A closes contacts A—1 and the stick circuit is completed through the stop key contacts 195.

It may be explained that on Fig. 13a all circuits and parts shown to the left and above the dot and dash line generally designated 196, are in the punch section of the machine and that the circuits to the right and below this dot and dash line 196 are in the calculating section of the machine. The DC buses 191 and 192 extend both into the punching unit and into the calculating unit and accordingly the same reference numerals will apply to the buses in both sections of the machine.

Figure 13D:
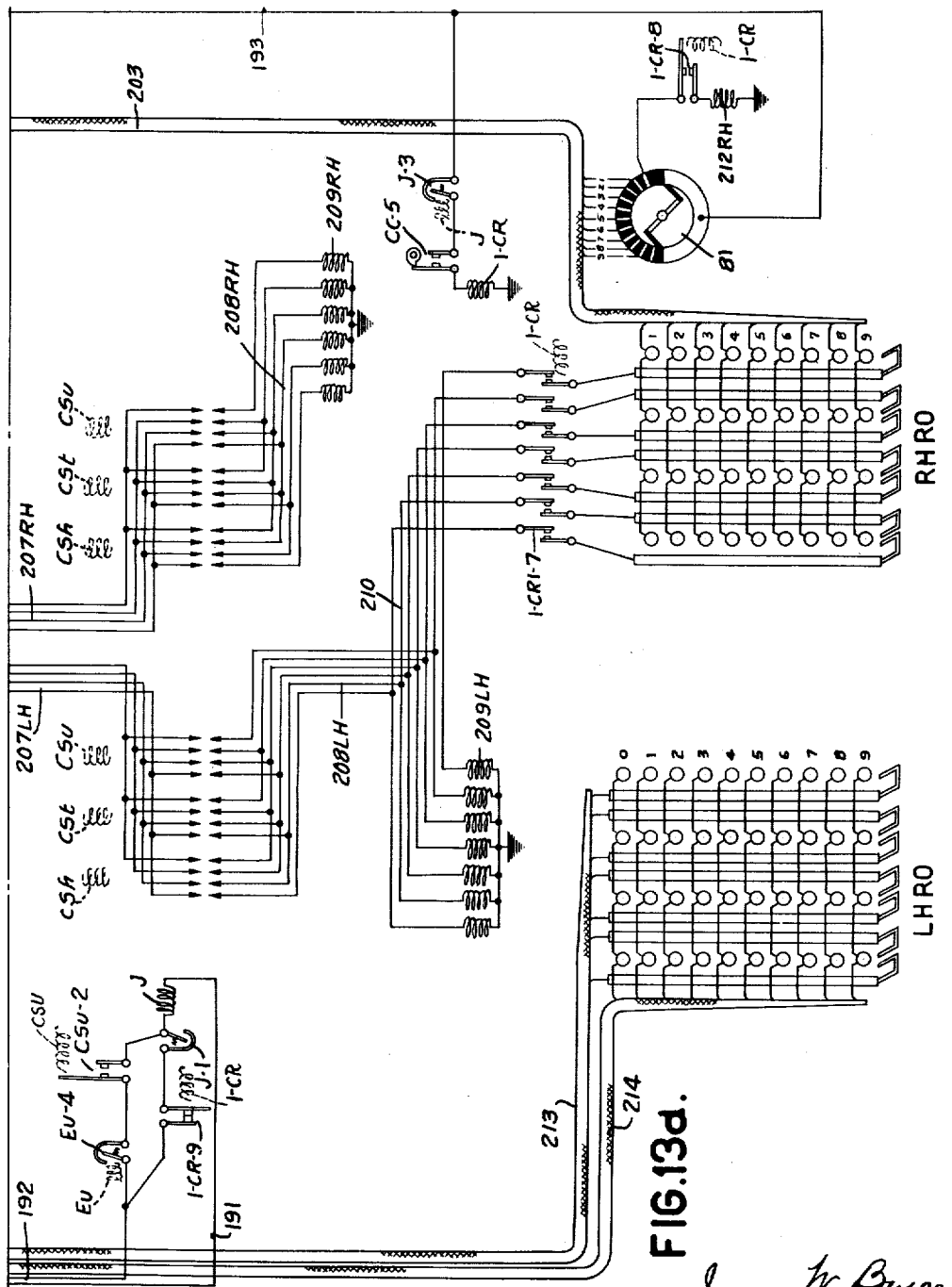

With the punch parts in the starting up position, contacts P—4 (Figs. 13a and 2) are closed and relay coil K is accordingly energized. Inasmuch as contacts P—3 and P—1 in the punch are now closed and relay coil A is energized, relay contacts A—2 will be closed and upon closure of cam contacts CC—2 there will be an energization of the punch feed clutch magnet 118. The energization of magnet 118 in the manner previously explained will bring about closure of contacts 121 and current will be supplied to the punch driving motor M—2. The lowermost card in the card magazine is now withdrawn from the R position and advanced to the R—1 position. After reaching the R—1 position, the card is picked up by the card carriage rack 102 and is advanced to a position in which the highest order column of the multiplicand field is under the sensing and reading out brushes 142. When the rack 101 has traversed completely to the left, contacts P—2 become closed and relay coil B becomes energized. The energization of B closes the contacts B—1 and a stick circuit is provided for coil B through the relay contacts K—2 which are now closed, because relay coil K is now deenergized due to the opening of contacts P—4. When coil B is energized, the machine is ready to read the multiplicand amount from the card. The brush 170 will now be standing on the highest order multiplicand spot 158 (i. e. the spot to the extreme right in Fig. 13a), and the brush 170 will also be in contact with 159 and 162. With relay coil B energized, relay contacts B—2 are closed and current accordingly flows from line 191, through contacts B—2 to strip 159 and then current flow from this strip branches, current flowing from 162 then through relay coil C and back to the other side of the DC line. The other current path is via the highest order spot 158 over to a relay coil D$th$ ($th$ signifying thousands). The energization of this D$th$ coil closes the D$th$ 1 to 9 contacts (Fig. 13b). The closure of contacts D$th$ 1 to 9 cuts into circuit a set of MC relays. It may be explained at this point that the calculating section of the machine includes sets of these multiplicand relays. One set of nine relays are provided for the thousands order of the multiplicand and similar sets of nine relays are provided for the hundreds, tens and units orders. Each multiplicand relay includes a coil M, which coil when energized establishes stick contacts M—1 (Fig. 13b) and which also establishes two sets of contacts M—$rh$ and M—$lh$, in the multiplicand readout. It will be assumed that the amount in the highest order in the multiplicand is 8. Referring again to Fig. 13a, the energization of relay coil C in the manner previously described brings about closure of relay contacts C—1 and current is supplied from DC bus 191 through relay contacts C—1 to the common block 143. Current flows from this common block 143 through the 8 brush, through a wire in cable 197, over through the three-blade N—8 contacts now in the position shown, down the 8 wire of the 198 group, through the 8—F relay coil, over to the digit 8 multiplicand relay magnet M in the thousands order, current flowing to this multiplicand relay through the D$th$—8 contact now closed. The digit 8 multiplicand relay in the thousands order is now retained energized by its stick contacts M—1, the stick circuit being completed through a wire 199 back through relay contacts B—3 to the other side 191 of the DC line. The energization of the 8—F relay coil will cause closure of the 8—F—1 relay contacts (Fig. 13a) and a circuit is established from the 191 side of the DC line through 8—F—1, via a wire 200 to the space magnet 150a back through the escapement contacts 139 and relay contacts B—5 now closed to the 192 side of the DC line. The energization of the space magnet 150a causes an escapement of the punch and a card feed to the next multiplicand column. The succeeding operations for the various other columns of the multiplicand are substantially the same as previously described. The next multiplicand relay to be energized, is a multiplicand relay pertaining to the hundreds order and following this is the energization of the multiplicand relay of the tens order and the units order. In the event that a significant figure digit is absent in any of the columns of the multiplicand, a zero will have been previously punched in such column of the card and the zero so punched in the multiplicand field of the card will establish a circuit through the N—0 three-blade contacts, through wire 201, directly down to the wire 200, to energize the space magnet 150a. In this way escapement actions are provided for in columns of the multiplicand where zeros appear. Where zeros appear in a particular multiplicand column there will be no set up of an M relay because no M relays are provided for zeros, such zero relays being unnecessary. Having completed the set up of the multiplicand on the M relays the card in the punch will be skipped under the control of the skip bar to the multiplier field. The brush 170 (Fig. 13a) will then be on the highest order multiplier spot 160 and will also be in contact with 161 and 163. With the brush 170 in this position, relay coil N becomes energized, relay coil C being now de-energized. The circuit to relay coil N is through relay contacts B—2, through 159 to 161, thence via brush 170 to 163 and back through relay coil N to the 192 side of the DC line. The energization of relay coil N will have shifted the three-blade relay contacts N—0 to N—9 inclusive to reverse position from that shown in the circuit diagram. Such shift of these three-blade contacts will cut off the entry circuits 198 to the M relays and establish circuit relations to a group of circuits 202, which extend down (see Fig. 13c) to the multiplier relay magnets X—1 to X—9 inclusive. A circuit is also established from the shifted N—0 contact to a 2—CR relay magnet (Fig. 13c). With the brush 170 standing on the highest order multiplier spot 160 a circuit is also established from the 191 side of the DC line through relay contacts B—2, 161, brush 170 to the highest order multiplier spot 160 and over to an E$h$ relay coil and back to the 192 side of the DC line. The energization of relay coil E$h$ ($h$ signifying hundreds order of the multiplier) brings about closure of relay contacts E$h$—1 (Fig. 13c). It will be assumed that the amount in the hundreds order of the multiplier is 5. With relay coil N (Fig. 13a) energized, relay contacts N—10 are closed and a circuit is established from the 193 side of the AC line, through relay contacts R—2 and S—2 now closed, through relay contacts N—10 over to the common strip 143, thence via the fifth brush, through the No. 5 wire in cable 197, down through the N—5 three-blade contacts now in shifted position to the fifth wire of the 202 group, down through the X—5 multiplier relay magnet, back through relay contacts E$h$—1 now closed, through the CS$h$ (column shift relay magnet) and back to ground upon the closure of cam contacts CC—3. The emitter 81 (Fig. 13d) now comes into action and impulses are emitted from this emitter through a cable 203, to the digit impulse lines 204 of the multiplier relay unit, through the X—5 contacts which are now closed, through the lines 206LH and 206RH, through the MCRO readout device which in the present instance comprises the set up M—$lh$ and M—$rh$ relay contacts, out via lines 207LH and 207RH, through the column shift relay contacts and through the lines 208LH and 208RH and to the 209LH and 209RH accumulator magnets. Left and right hand components of partial products are then entered into the LH and RH accumulators of the amount of the set up multiplicand multiplied by 5.

The multiplier relays are each provided with extra contacts X—1a, X—2a, etc. (see Fig. 13a). The column shift relays are likewise provided with extra contacts which are designated CS$u$—1, CS$t$—1 and CS$h$—1. During the entry of the components of partial products, selected ones of these extra contacts are closed and after the entering operation is complete, contacts CC—4 (Fig. 13a) close. Closure of contacts CC—4 establishes a circuit from the 191 side of the DC line, through one of the extra X contacts, in this instance X—5a, through one of the CS extra contacts, in this instance CSh—I, over to line 200 and back through the space magnet 150a and the escapement contacts 139, through relay contacts B—5 now closed to the other side 192 of the DC line. The energization of the space magnet 150a escapes the card in the punch one column to the next lower order of the multiplier. The operation is then repeated for successively lower orders of the multiplier.

If there is a zero in any column of the multiplier, a circuit is established through the zero brush 142, through the now shifted N—0 contacts, down to the 2—CR relay coil (Fig. 13c) and back through one of the E—I contacts, for example, the one pertaining to the tens order, i. e. Et—I, through the CSh magnet and cam contacts CC—3 and back to ground. It will be noted that there is no X relay provided for zero and accordingly no entries will be made of a zero appearing in the multiplier. With a zero in the multiplier with relay coil 2—CR energized, the extra contacts 2—CR—I are closed and upon closure of CC—4 a circuit will be established through 2—CR—I, through one of the CS—I extra contacts, for example CSt—I, back to the space magnet 150a and back to the other side of the line. The energization of the space magnet 150a will space the card over the zero column of the multiplier.

After the operation in the units order of the multiplier has been completed, the machine is ready to transfer the accumulation of partial products in the RH accumulator into the LH accumulator. During multiplying by the units order of the multiplier, relay coil Eu (Fig. 13a) becomes energized and the energization of this coil closes relay contacts Eu—4 (Fig. 13d). Extra contacts CSu—2 are also provided on the column shift relay pertaining to the units order of the multiplier only and such CSu—2 contacts become closed during the multiplying operation. With contacts Eu—4 and CSu—2 closed, a circuit is established from the 192 side of the line to energize relay coil J. The energization of coil J closes stick contacts J—I, the stick circuit being completed through contacts I—CR—9 now closed. The energization of relay coil J closes contacts J—3 (Fig. 13d) and late in the computing cycle pertaining to the units order of the multiplier, contacts CC—5 close, energizing relay coil I—CR. In the following computing cycle, contacts I—CR I to 7 close and accordingly, a circuit is established from the RHRO readout to the transfer lines 210 leading to the 209LH counter magnets. With the emitter 81 in operation, impulses are emitted through the RHRO readout device, through the I—CR I to 7 contacts, over via the transfer lines to the 209LH accumulator magnets. This operation transfers the amounts standing in the RH accumulator into the LH accumulator.

After the card has reached the units order column of the multiplier and the amount has been read out and computed, the card will escape to the product punching position. Provision must be made, however, to prevent the beginning of product punching until the amount standing in the RH accumulator has been transferred over into the LH accumulator. Dual provisions are provided for preventing premature reading out of the product. The energization of the J relay (Fig. 13d) will cause opening up of the J—2 contacts (Fig. 13a) and will interrupt the circuit 211 to the common strip 167 at the product zone. During the RH to LH transfer contacts I—CR—9 open up and break the stick circuit for relay coil J which extends through relay contacts J—I. Concurrently with the opening of contacts I—CR—9, contacts I—CR—II (Fig. 13a) open up and accordingly the circuit to 167 is still interrupted notwithstanding that the J—2 contacts may now re-close upon the de-energization of relay coil J. After the amount has been transferred from the RH accumulator to the LH accumulator, the machine can proceed with the resetting of the RH accumulator. This is effected by the brush of the emitter 81 encountering the extra spot and establishing a circuit through contacts I—CR—8 now closed to the 212RH reset magnet. The energization of this magnet initiates reset of the RH accumulator in the usual way. Upon completion of the RH to LH transfer contacts I—CR—8 reopen to prevent repeated reset. When the transfer from RH to LH is complete, contacts I—CR—II (Fig. 13a) re-close and the machine is now ready to read out the final product from the LH accumulator. At this time brush 170 will be on the spot 166 to the extreme right and will also be in contact with 167.

The readout circuit to the punch selector magnets is as follows. From the 192 side of the DC line (Fig. 13a), through relay contacts B—5 now closed, through the escapement contacts 139, through relay contacts J—2 now closed, through contacts I—CR—II now closed, through wire 211 to strip 167, thence to the highest order spot 166, through a wire in cable 213, down through the LHRO readout and out via a particular wire in cable 214, back to the particular punch selector magnet 150 and back to the 191 side of the DC line. Punching of the product now proceeds column by column in the manner previously explained in connection with the description of the punch. During operation on each column the punching magnet 151 is energized, the contacts 155 are closed and the escapement contacts 139 open upon escapement. The product is read out column by column until the complete product is punched on the card. After the complete product is punched in the card, the skip bar traverses the card to beyond the last column position. Upon reaching such position, contacts P—4 become closed and relay coil K is energized (Fig. 13a). Energization of relay coil K opens contacts K—2 and breaks the stick circuit for relay coil B. The energization of relay coil K also closes relay contacts K—I and when cam contacts CC—I close, the card ejector clip magnet 180 is energized. The completed card is then ejected from the punch. Concurrently with the energization of the ejector clip magnet 180, a circuit is established through P—6 now closed to the 212LH reset magnet. Energization of this magnet initiates reset of the LH accumulator. Upon the swinging of the ejector clip assemblage, contacts P—6 open to prevent repeated LH reset. Upon the ejection of the card, contacts P—3 become closed and upon closure of cam contacts CC—2 a circuit is established to the punch feed clutch magnet 118 to again energize this magnet and initiate a new series of card handling and computing operations on the following card. Before the succeeding operation is initiated on the following card, provision is made for de-energizing the M relays.

It has been previously explained how relay coil B becomes de-energized upon opening up of relay contacts K—2. The de-energization of relay coil B causes the opening of contacts B—3 (Fig. 13b) to break the stick circuit line 199 to the multiplicand relays. The multiplicand relay coils are then all de-energized and are ready to receive a new set up.

*Multiplication with multiplier from fixed set up*

During multiplying operations where both the multiplicand and multiplier are derived from the card, a switch 215 (Fig. 13a) will be maintained in open position. When it is desired to derive the multiplier from the fixed set up instead of from the card, this switch 215 will be thrown to closed position. When readings of multiplier amounts from fixed set ups are to be used in computations, provision is made for setting up two possible multipliers on the two setup devices. Then in the operation of the machine, selection is made automatically as to which multiplier of the two is to be used, depending upon the presence of a special perforation or perforations in the multiplicand field of the card. Accordingly, the machine under record card control automatically selects which of two fixed multipliers are to be entered into the machine and used in the computation. The extra controlling perforations in the multiplicand field of the card for controlling this multiplier selection may be the extra perforations at the top of the card in the 11th and 12th index point positions. If there is a hole in a column of the multiplicand field in the 11th position the multiplier will be selected from the MP—1 setup device and likewise if there is a hole in a column in the 12th position instead of the 11th, the selection will be made from the MP—2 setup device.

It will be assumed that a card is read which has the 11th point in a given column of the multiplicand field perforated. On the 11th brush encountering this perforation a circuit is established through the 11th wire in cable 197, relay contacts C—2 which are closed during entry of the multiplicand by the energization of relay coil C, through relay coil R, through relay contacts B—4 now closed, switch 215 now closed and back to the other side 192 of the DC line. The energization of relay coil R will close stick contacts R—1 and maintain R energized, through the now closed 1—CR—10 contacts. The energization of relay coil R occurs during the reading of any column of the multiplicand in which the extra perforation appears at the 11th index point position. The control provided by R is, however, utilized later on in the cycle of operations of the machine when the multiplier amount is to be effective to control a computing operation of the machine. The energization of the R relay coil opens contacts R—2 (Fig. 13a) and interrupts the supply circuit from the AC line 193 at the time when a multiplier amount otherwise would be read from the card, that is, during the time that the N—10 contacts are closed. The energization of R will have also closed relay contacts R—3 (Fig. 13b) and provided current supply from the AC bus 193 to one side of the E$u$—2, E$t$—2 and E$h$—2 relay contacts. When the multiplier zone of the card is reached, the relay coil E$h$ becomes energized in the manner previously explained and accordingly relay contacts E$h$—2 (Fig. 13b) close. Upon the closure of cam contacts CC—3 (Fig. 13c), a circuit will be established from the 193 side of the AC line through 216, through contacts R—3 now closed, through E$h$—2 now closed, to the hundreds order fixed MP—1 setup device and through the previously set up brush to one of the lines 211 which connect back to the lines 202 and which extend to the multiplier relay magnets. The amount of the highest order of the MP setup device is then read and used to control the multiplying relays. Following the operation by the hundreds order of the fixed setup there is an escapement of the card and a reading is taken from the tens order setup device followed by a reading from the units order and so on. If in lieu of perforating the card in the multiplicand field at the 11th index point position any column of the multiplicand field of the card is perforated at the 12th index point position relay coil R will not become energized, but relay coil S will become energized. The energization of relay coil S will provide for a readout from the MP—2 readout device in a manner which need not be traced as it is substantially the same as the operation for the MP—1 readout.

When fixed multiplier operations are being performed, provision is made after multiplication is complete for breaking down the previous setup of either the R or S relay coils. This is effected by the opening of contacts 1—CR—10 (Fig. 13a), such contacts opening upon the RH to LH transfer upon the energization of relay coil 1—CR (Fig. 13d).

It may be further explained that even if switch 215 is thrown to closed position that the multiplier amount will not necessarily be selected from and read from the fixed setup multiplier devices. Unless an extra control hole is present in the record card there will be a reading taken of the multiplier amount from the card instead of from the multiplier setup device or devices. Accordingly the machine may be run with the switch 215 in closed position and the machine will then read from the fixed multiplier set up for cards with the extra control hole and read the multiplier amounts from the card for each card where such control hole is absent and where the multiplier amount is upon the card. However, with switch 215 in open position, the machine will invariably derive the multiplier amount from the card and not from the fixed setup device.

The present application discloses subject matter also disclosed in my copending application Serial No. 554,976, filed August 4, 1931.

What I claim is:

1. A record controlled and record making accounting machine including record sensing means and record punching means, each being of the successive column type, means for automatically withdrawing a card from a magazine and presenting it to the sensing means in position to commence reading one factor of a computation, means for thereafter automatically advancing the record step by step and column by column, means operative during such last mentioned operation for reading the record and entering and holding a set-up of the digits which are read and entered, means to again automatically advance the card to the sensing means to read the other factor column by column, means operative and controlled by the sensing means as each digit of the second factor is read for multiplying all the digits of the previously entered and set-up factor by such second read digits in succession, and for entering the product into product receiving means of the machine.

2. A record controlled accounting machine with record handling mechanism adapted for the automatic handling of records from a stack one at a time and in automatic succession and for advancing each record column by column, sensing means for sensing each record index point column by index point column as it is advanced by the record handling means and recording devices for recording computed data upon each record handle, computing means controlled by the sensing means, said computing means having result receiving means adapted to control the recording means and control means controlled by the second handling mechanism for causing automatic operation of the card handling and computing means so that one record may be handled, sensed and computed results recorded and thereafter the said operations automatically reinitiated and repeated for succeeding other records in the stack.

3. A record controlled and record making multiplying machine for multiplying amounts together and recording the product upon a record from which one factor of the computation was derived including a plurality of multiplier setup devices upon which two separate multipliers may be set up by the operator, record controlled means for entering the multiplicand factor into the machine from a record, record controlled means for selecting which of the preset multipliers are to be used in the computation and multiplying means controlled by the entered multiplicand and selected multiplier for multiplying the multiplier so selected by the multiplicand read in from a record.

4. A multiplying accounting machine, including in combination, a multiplicand setup device, entering means for a multiplicand amount therein from a record, a device upon which a multiplier may be preset by hand, record controlled multiplier deriving means, means for optionally deriving a multiplier from the record containing the multiplicand or from the preset device, said last mentioned means including a control means which comprises a manually settable switch and a cooperating record card controlled means, and multiplying means controlled by the multiplicand setup device and by the derived multiplier for multiplying the entered multiplicand by the selected and optionally derived multiplier.

5. A multiplying accounting machine, including in combination, a multiplicand setup device, means for entering a multiplicand amount therein from a record, a plurality of devices upon which multiple multipliers may be preset by hand, record controlled multiplier means, means for optionally deriving a multiplier from the record containing the multiplicand or from the preset devices, multiplying means for multiplying the entered multiplicand by the selected and optionally derived multiplier and supplemental control means controlled by the multiplicand setup device and by the derived multiplier for controlling from which one of the preset devices the multiplier is to be derived when such multiplier is derived from the preset devices.

6. A record controlled and a record making accounting machine with a record handling mechanism to withdraw records one by one from a card magazine and advance each record to a position in which one of the factors of a problem may be read, means for reading such factors step by step and column by column, including means under the control of the reading means for setting up one of the factors so read, means for thereafter effecting the advance of a record to a position at which reading of the second factor may commence, means for reading the second factor step by step and column by column, multiplying means controlled by the setup means for the one factor and under the control of the second factor reading means and effective during each said last mentioned step for effecting multiplication, said multiplying means including means for entering and accumulating the partial products of the multiplying computation, means for then advancing the card to a product receiving position, means under the control of the partial product accumulating means for thereafter punching out the product in the card and ejecting means for ejecting the card and initiating clearing of the machine so that a new computation can be received and in which means is provided operated by the ejecting means upon ejection of the card for automatically initiating a new card handling and computing operation upon a new card.

7. A multiplying machine including factor receiving means in which factors are entered at each entering operation of the machine, multiplying devices controlled thereby and also adapted to be controlled by either the multiplier factor data reading means or a fixed multiplier setup means, record reading devices for reading factor data from a record for entry into the factor receiving means and for reading multiplier factor data, fixed multiplier setup means, multiplier selector devices for selecting a multiplier from a record or from the fixed multiplier setup means, and controls for said selector devices whereby multiplier amounts to be multiplied by the amount in the factor receiving means may be optionally derived from the record by the reading means or from the fixed multiplier set up means, said controls including record controlled devices which function for selective control of the operation of the selectors at each entering and record reading operation of the machine.

8. A record controlled accounting machine with a record handling, record reading and record punching unit, said unit being of the step by step type with means for reading the records and means for punching the same record, said reading and punching being both effected index point column by index point column, an accounting unit, a retaining relay type of entry receiving device controlled by the record reading means for setting up and retaining an entry of an amount read from a record index point column by index point column by the reading means, means for controlling said accounting unit to compute a result under the control of the set up of the retaining relay type of entry receiving device and under the control of the column by column reading of data by the reading means of the other unit, and means for controlling the punching means to record a computed result under the control of portions of the accounting unit after such accounting unit has effected its computation.

9. A record controlled and record making accounting machine including an accounting unit and an electrically connected record reading unit with reading means for sensing records index point column by index point column, a retaining relay type of entry retaining device set up under control of the reading means for retaining a set up of an entry after the record has been sensed and controls for said accounting unit cooperating both with said relay type of set up device and with the reading means in the reading unit to provide for the control of the accounting unit to effect accounting operations as column by column sensing of the records proceeds.

10. The invention set forth in claim 15, in which the control means for the multiplier selecting means includes a switch which when set to one position causes both the multiplier and multiplicand amounts to be derived from the record, and which switch when set to another position renders the selecting means effective so that the multiplier to be derived from the fixed multiplier set up means.

11. The invention set forth in claim 15, in which the control means for the multiplier selecting means includes a switch settable to one position for causing the multiplier and multiplicand amounts to be derived from the record and settable to another position to render the selecting means effective so that the multiplier may be derived either from the record or from the fixed multiplier set up means, and a cooperating record controlled control means to cause the multiplier to be derived either from the record or from the fixed multiplier set up means depending upon the character of the record and with the aforesaid second mentioned setting of the switch.

12. A record controlled multiplying machine comprising in combination, record reading means for successively sensing successive columns of a record, record handling means for successively advancing a record column by column past said sensing means, a multiplicand entry retaining device which is set up under the control of the sensing means upon successive sensings of successive columns of a record thereby for controlling multiplying operations, multiplying devices and means for controlling the same, said named means comprising means upon which the amount of a multi-denominational multiplier is set up and means for bringing the multiplying devices into operation upon the advance of the record column by column under the action of the record handling means so that multiplication may be effected between successive multiplier amounts pertaining to different orders of the multiplier and the amount of the previously entered and retained multiplicand.

13. A record controlled multiplying machine comprising in combination, record sensing means, record handling means for successively advancing a record column by column to said sensing means, a multiplicand entry receiving device controlled by the record sensing means under successive sensings of successive columns of a record for controlling multiplying operations, multiplying means including devices selected according to the amount of the multiplier and controlled by the record sensing means upon successive sensings of successive other columns of the record and means for bringing the multiplying devices into operation as the record advances column by column by the record handling means so that multiplication may be effected between the successive multiplier amounts pertaining to different orders of the multiplier upon the record and pertaining to the amount of the previously entered and retained multiplicand.

14. A record controlled multiplying machine comprising in combination, record handling means for successively advancing a record column by column, record sensing means for sensing a record column by column as it is advanced by the handling means, a multiplicand entry receiving device controlled by the sensing means upon successive sensings of successive columns of a record for controlling multiplying operations, multiple multiplier setup means upon which several separate multipliers may be set up by the operator, record controlled means for selecting from which of the multiplier setup means a multiplier amount is to be derived, multiplying devices selected under the control of the selected setup means and according to the amount of the multiplier in the corresponding columnar order of the multiplier setup means, means brought into operation by the handling means upon the advance of the record column by column for bringing about multiplying operations between the successive multiplier amounts pertaining to different orders of the selected multiplier and the amount of the previously entered and retained multiplicand.

15. A record controlled accounting machine, comprising record reading means for reading factor data from a record, multiplicand entry setup means controlled by the record reading means for receiving and retaining a set up of a multiplicand derived from a record by the record reading means, a fixed multiplier setup means upon which a multiplier amount may be pre-set by the operator, record controlled multiplier deriving means, multiplier selecting means for selecting which multiplier amount is to be derived, whether from the reading means from a record or from the aforesaid fixed multiplier setup means, control means for the aforesaid selecting means and multiplying devices receiving the multiplier as selected by the selecting means and cooperating with the multiplicand entry set up means for control of multiplying operations.

16. The invention according to claim 15 wherein the control means for the selecting means includes record controlled means to selectively control the operation of the control means from a record according to the characteristics of the record.

17. A record controlled multiplying machine comprising means for reading factor data from a record, a multiplicand entry set up means controlled by the reading means for receiving and retaining a set up of the multiplicand derived from a record, a plurality of fixed multiplier setup means upon which a plurality of different multipliers may be pre-set by the operator, multiplying means controlled by multiplier setup means and by the multiplicand setup means and including devices to receive amounts of a multiplier which is selectively derived from one of the aforesaid fixed multiplier setup means, selecting means to select from which setup means the multiplier is to be derived, control means for the selecting means to control the selection to be effected thereby and means including record sensing means to pre-sense a record for special characteristics and control the selecting means accordingly.

18. In a record controlled accounting machine of the type which derives factors of a computation from a record and with punching means to record the product upon the record from which the factors were derived, including the combination of a record handling mechanism for automatically and successively advancing a record column by column, means for reading data from a record column by column as it is so successively advanced, means controlled by said reading means including receiving means for one factor, multiplying means controlled by the receiving means and by the reading means, and having result receiving means, for automatically effecting a computing operation of the received data in the factor receiving means as the other factor data is read and for setting up the product, means controlled by the record handling mechanism for automatically initiating computing operations, means automatically effective after computing is complete for initiating punching of the product under the control of the product receiving means by the punching means and means including control means effective after punching is complete and controlled by the record handling means for automatically initiating record handling to bring a new record to the reading position at which reading of the factor data therefrom may commence.

19. In a record controlled accounting machine with step by step punching mechanism having a card handling section through which records are advanced, calculating mechanism with product receiving means which control the punching mechanism and with control means for the calculating mechanism to automatically bring about calculating and with control means controlled by the calculating mechanism after calculating is complete to bring about punching and including in combination therewith, sensing means in the card handling section, card handling means for advancing records through said section to the sensing means so that they may be sensed column by column as each record is advanced, receiving means for one factor controlled by the sensing means and controlling the calculating mechanism, and means to also control the calculating mechanism from said sensing means to effect multiplication digit by digit and column by column as the card is sensed.

20. In a record controlled and record making accounting machine with calculating mechanism having product receiving means controlling the punching of product results upon each record and with card handling means for advancing a card to a product receiving position, whereupon the product is automatically punched upon the card, the combination including the aforesaid card handling means to automatically withdraw records one by one from a card magazine and to advance each record column by column to a position at which one of the factors of a problem may be read therefrom, means for reading such factor step by step and column by column upon the further advance of such record by the card handling means, means controlled by said reading means for receiving such factor data, means for thereafter causing the card handling means to automatically effect the advance of the record to a position at which reading of the second factor may commence, means for reading the factor step by step and column by column, the aforesaid calculating means including multiplying means effective during each said last mentioned step and controlled by the last reading means and by the means receiving the previous read factor data for effecting multiplication and causing the product to be set up upon the result receiving means whereupon result punching may ensue.

21. A multiplying accounting machine, including in combination, a multiplicand setup device, means for entering a multiplicand amount therein from a record, a device upon which a multiplier may be pre-set by hand, record controlled multiplier deriving means, means for optionally deriving a multiplier from the record containing the multiplicand or from the pre-set device, and multiplying means controlled by the multiplicand setup device and by the derived multiplier for multiplying the entered multiplicand by the selected and optionally derived multiplier.

22. A record controlled multiplying accounting machine comprising in combination, record sensing means, record handling means to advance the record column by column past the sensing means, a multiplicand entry receiving device set up under the control of the sensing means upon successive sensings of successive columns of a record, a multiplier setup means for a multi-columnar multiplier, multiplying devices selected under the control of the setup means according to the amount of the multiplier in the corresponding columnar orders of the multiplier setup device and means for bringing the multiplying devices into operation after each advance of the record column by column and multiplying means controlled by the multiplying devices and by the multiplicand entry receiving device so that multiplication may be effected between successive multiplier amounts pertaining to different orders of the multiplier set up upon the setup device and the amount of the previously entered and retained multiplicand.

23. A record controlled multiplying machine comprising record sensing means, record handling means to advance the record column by column past the sensing means, a retaining relay type of multiplicand entry receiving device set up by energizing the relays thereof under the control of the record sensing means upon successive sensings of successive columns of a record, multiplying devices under the control of the record sensing means selected according to the amount of the multiplier derived from successively sensed other columns of the record, control means for bringing the selected multiplying device into operation as the record advances column by column under the action of the record handling means, and multiplying means controlled by the multiplying devices and by the multiplicand entry receiving device so that multiplication may be effected between successive multiplier amounts upon the record pertaining to different orders of the multiplier and to the amount of the previously entered and retained multiplicand.

24. An accounting machine of the record controlled type for performing computations, including computing means, record reading means, record controlled factor receiving means, hand setup devices for one factor of the computation, said computing means being controlled by the factor receiving means or by one factor receiving means and the hand setup device, a cycle and column shift controller for said computing means, and means for selectively associating the cycle and column shift controller for control either by the record controlled factor receiving means or by the hand setup device.

25. In a multiplying machine for multiplying a multiplicand amount derived from each record by a multiplier amount including multiplying devices and means for controlling the same, said means including a record controlled multiplicand entry receiving means and means selected according to the digits of the multiplier factor and means for controlling the last mentioned means and thereby controlling the multiplying devices, said last mentioned means including manually presettable means adapted to set up a multi-denominational multiplier which is to be used for each of a series of computations involving multiplicand amounts derived from each of a series of records.

JAMES W. BRYCE.

CERTIFICATE OF CORRECTION.

Patent No. 2,090,103. August 17, 1937.

JAMES W. BRYCE.

It is hereby certified that error appears in the printed specification of the above numbered patent requiring correction as follows: Page 9, first column, line 9, claim 2, for the word "second" read record; line 33, claim 4, strike out the word "entering" and insert the same after "for", same line and claim; line 51, claim 5, after "multiplier" insert deriving; and that the said Letters Patent should be read with these corrections therein that the same may conform to the record of the case in the Patent Office.

Signed and sealed this 19th day of October, A. D. 1937.

(Seal)

Henry Van Arsdale.
Acting Commissioner of Patents.